United States Patent [19]

Novak et al.

[11] Patent Number: 4,924,228

[45] Date of Patent: May 8, 1990

[54] AIRCRAFT CONSTRUCTION

[75] Inventors: Philip F. Novak; Robert D. Shannon, both of Wichita, Kans.; Robert L. Pinckney, Cheyney, Pa.; James R. Humphreys, Jr., Wichita, Kans.

[73] Assignee: Boeing Company

[21] Appl. No.: 295,644

[22] Filed: Jul. 17, 1963

[51] Int. Cl.[5] .......................... B64C 1/38; G01S 7/38
[52] U.S. Cl. ...................... 342/2; 244/121; 342/4; 342/5; 342/7
[58] Field of Search ................ 244/119, 35, 53, 121; 343/18; 342/2, 4, 5, 7

[56] References Cited

U.S. PATENT DOCUMENTS

| | | | |
|---|---|---|---|
| 1,727,394 | 9/1929 | Carns | 244/119 |
| 2,436,578 | 2/1948 | Korn et al. | 244/1 R |
| 2,531,541 | 11/1950 | Spicer | 343/18 A |
| 2,562,227 | 7/1951 | Zobel | 244/35 |
| 2,573,834 | 11/1951 | Davidson | 244/53 |
| 2,575,185 | 11/1951 | Mulholland | 244/35 |
| 2,659,884 | 11/1953 | McMillan et al. | 343/18 A |
| 2,819,032 | 1/1958 | Detrie et al. | 244/119 |
| 2,854,668 | 9/1958 | McMillan et al. | 343/18 A |
| 2,937,829 | 5/1960 | Martin | 244/121 |
| 2,956,281 | 10/1960 | McMillan et al. | 343/18 A |
| 2,985,880 | 5/1961 | McMillan et al. | 343/18 A |
| 2,996,709 | 8/1961 | Pratt | 343/18 A |
| 2,996,710 | 8/1961 | Pratt | 343/18 A |
| 2,998,212 | 8/1961 | Rogers, Jr. | 244/121 |
| 3,058,704 | 10/1962 | Bergstedt | 244/119 |
| 3,066,892 | 12/1962 | Smith et al. | 244/53 |

OTHER PUBLICATIONS

Montgomery, C. G.; "Principles of Microwave Circuits"; McGraw Hill; 1948; pp. 396–400.

Primary Examiner—Charles T. Jordan

[57] ABSTRACT

An aircraft structure for the minimization of microwave energy reflection from the aircraft back to a receiver. The provision of structural configurations and materials operate to reduce microwave energy reflection toward its source or another receiver located at a level below the aircraft and laterally or forward thereof.

11 Claims, 4 Drawing Sheets

FIG. I

AIRCRAFT CONSTRUCTION

This invention relates to aircraft construction. More particularly this invention relates to the minimization of microwave energy reflection from an aircraft back to a receiver.

Minimization of radar reflectivity is of varying importance in different kinds of military missions. The configuration shown herein is of a reconnaissance and surveillance vehicle where survival may be largely contingent on avoidance of detection. The details described will variously apply to other aircraft and other military vehicles.

Among the objects of this invention is the provision of novel structural configurations and material means operating to reduce microwave energy reflection toward its source or another receiver located at a level below the aircraft and laterally or forward thereof.

Another object of this invention is the provision of a novel structure providing aerodynamic shaping, reflecting microwave energy in a direction away from its source, absorbing microwave energy, providing electrical shaping in different configurations than the aerodynamic shaping, and/or avoiding or shielding reflective surfaces in the aircraft.

Further objects of this invention reside in the providing of means directing microwave energy reflection upwardly from an aircraft; of providing the above means in a structure with sufficient strength at a reasonable cost and suitable weight; of providing a novel inlet duct to an aircraft power plant minimizing reflection off the face of the power plant back toward the microwave energy source; and/or of providing optimum visibility through a canopy from a cockpit of the aircraft while minimizing microwave energy reflection therefrom.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
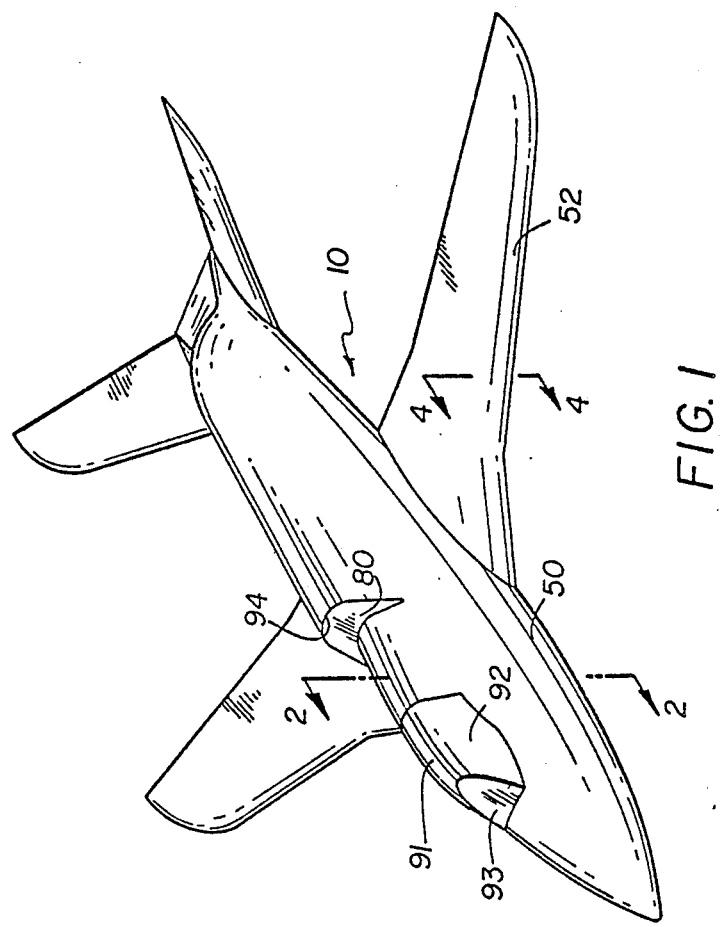
FIG. 1 is a perspective view of a reconnaissance and surveillance vehicle forming a specific embodiment of the invention.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

An aircraft, indicated generally by the reference numeral 10 in FIG. 1, is of a reconnaissance-surveillance type. The structure and materials of the aircraft 10 are adapted to minimize radar reflection or at least radar reflection in the direction of a radar transmitter. Those skilled in the art will understand when similar structures and material systems should be used on other types of aircraft. The description will be confined to those matters having pertinency to the question of radar detection and having novelty over what has previously appeared in the art.

Figure 2:
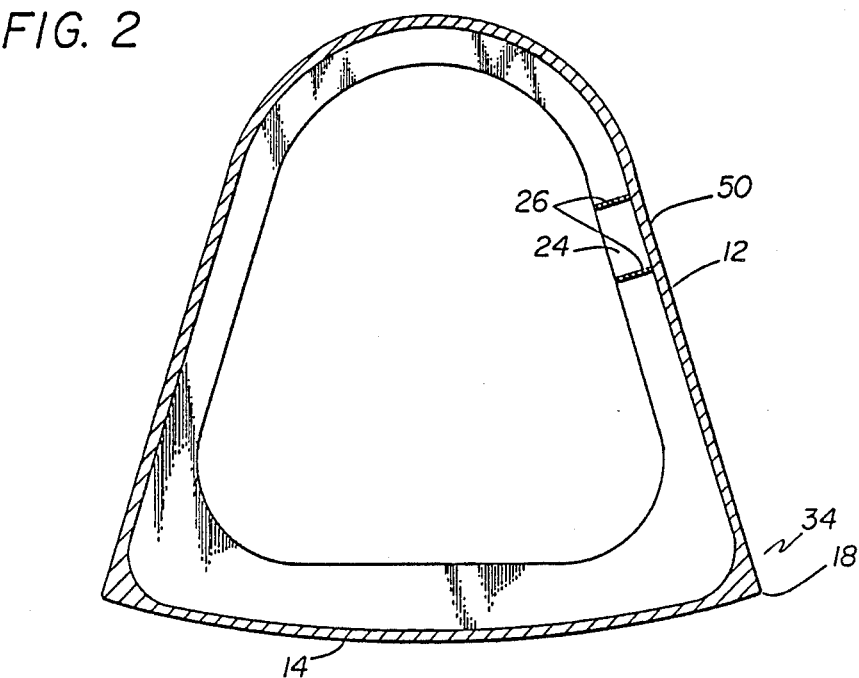
FIG. 2 is a bell-shaped cross sectional view of the vehicle taken along line 2—2 of FIG. 1.
Figure 3:
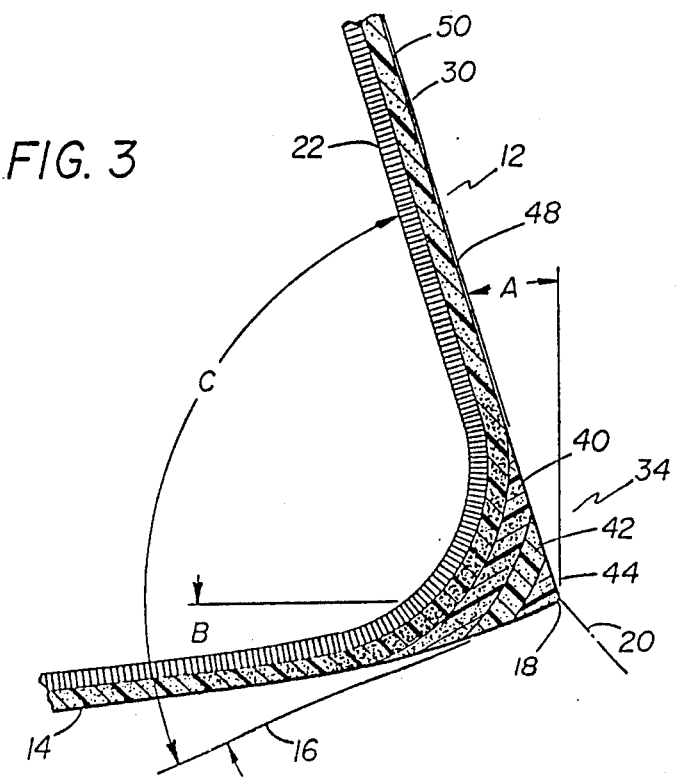
FIG. 3 is an enlarged view of a lower starboard side corner portion of the fuselage cross section shown in FIG. 2.

Referring to FIGS. 2 and 3, the cross sectional details are typical of those substantially throughout the fuselage area. A fuselage side wall 12 forms an angle A to the vertical. In an ideal condition, the aircraft structure would absorb or transmit all microwave energy. As this is not totally feasible, there will be some amount of reflection, and the side wall 12 is preferably configured to reflect in an upward direction the energy originating laterally of and below the aircraft. The side wall 12 would have minimum reflection toward the radar source if angle A were 90° to the vertical, the fuselage then being a flat plate. This is assuming that the energy source is coplanar with the plate. Obviously a compromise must be effected so the fuselage can perform normal aircraft functions. It would be desirable to have an angle A of 45° to the vertical, but a more suitable compromise is for angle A to be a minimum of 10° and preferably not more than 20°. The drawing shows angle A as 17°. This angle will direct reflection upwardly in normal aircraft flight. It is understood that the angle A to the vertical will change when the aircraft is banked or rolled.

A fuselage bottom wall 14 preferably would be horizontal but is compromised so the fuselage can accommodate normal aircraft functions by being configured as a curved, relatively shallow convexity. A line 16, lying tangent to the bottom wall 14 adjacent to a corner 18, forms an angle B with the horizontal. The angle B is preferably a minimum value but not so low as to impair the normal fuselage functions. An angle C between the side wall 12 and the tangent line 16 preferably, in view of necessary compromises, has a value within a range of 75° to 100°. The angle C is shown in FIGS. 2 and 3 of the drawings as being approximately 100°. Understandably, it would be desirable to reduce the angle as much as possible consistent with other considerations.

The radius of the corner 18 should be minimal as the corner forms a surface reflective back toward a microwave energy source that is located laterally of and below the aircraft, such as defined by a radar source line 20. This reflective surface is theoretically a line defined by a tangent to the corner 18 at the illustrative radar source line 20 from its transmitter. A one-inch maximum radius is feasible in most aircraft constructions. The smaller the radius the better. The radius shown in the drawing is preferably to be taken as half an inch as this was the radius used in the structure described in FIGS. 2 and 3.

FIGS. 2 and 3 illustrate a typical cross section through the aircraft fuselage. The structural shell of the fuselage, carrying most of the loads, is formed with a honeycomb structure 22. The honeycomb 22 may be similar to the kind of fiberglass honeycomb presently commonly used in the aircraft art for various purposes. The honeycomb 22 has glass fibers. The skins of the honeycomb 22 are impregnated with resinous material. Fiberglas honeycomb is preferable to paper honeycomb as its resistance to moisture is superior. Moisture increases reflectivity of microwave energy. In the various places herein where fiberglas reinforced plastic is mentioned, it will be understood by those skilled in the art that Nylon* or other artificial fibers can be substituted. The structure can be made of sufficient load carrying strength to perform its designated functions in a vehicle, such as is herein described. Other structural details such as fiberglas formers 24 and longerons 26 can also be made of sufficient strength to perform the designated functions thereof.

* Trademark of Dupont, Wilmington, Del.

The shell 22 has a blanket 30 of rigid structural foam. The expression "rigid structural foam" defines a foam having significant load carrying properties, as distinguished from a flexible foam. It is desirable to fill this foam by a suitable method such as is disclosed in the copending patent application, Serial Number 263,704 filed Mar. 8, 1963, entitled "Open Cell Rigid Foam," Marlan R. Pollock and Marlyn F. Harp, inventors.

The foam blanket 30 preferably has a thickness of approximately one inch. The foam is filled with a microwave energy absorbing or dissipating material whereby the composite structure absorbs, rather than reflects, microwave energy by converting the microwave energy to heat. The blanket 30 preferably has a dielectric constant of between 2 and 10. Carbon is a preferred filler but it is possible to user other materials, such as iron or nichrome. A filler may be introduced into the mixture before foaming but a better structure is achieved if it is absorbed into an open cell foam in a manner such as is described in the above patent application. The blanket 30 is bonded in place by a suitable bonding agent. Other than the details set forth herein, the selection of foam and filler, and the techniques of formulation and application, are within the skill of the aircraft and chemical materials and processes people, who are familiar with various considerations involved, including providing suitable strength, weight, economy, and so forth.

In some installations, considerations may dictate placing foam of a uniform or graded dielectric constant 30, within the interstices of the honeycomb 22. The filler is in the foam of finely divided particles that do not provide a continuously conductive surface. The foam wall tends to insulate any filler particles. Additionally, at least a part of any resistance to current flow depends on the nature of the filler. Carbon in finely divided form provides good resistance. The filler is a material which will support a current, e.g., the material selected must have the proper combination of properties as a conductor and as an insulator. Carbon black has proven to be a preferred form of carbon.

One measure of the property of the filler is its resistivity measured in microohms per centimeter. Carbon has a resistivity in microohms per centimeter of approximately 1000 to 5000. Aluminum has a resistivity of 1–10 microohms per centimeter, and nichrome has a resistivity of 150–200 microohms per centimeter. Generally the resistivity should be as high as possible without effectively operating as an insulator. The operable range in resistivity is given as 100 to 10,000 microohms per centimeter.

The approximately one inch thickness of the blanket 30 is designed to have substantial effect in absorbing microwave energy of about 2000 to 2600 megacycles (mc) and above. If the thickness were reduced to ½ inch, the principal effectivity would be about 4000 mc and above. The limit on the principal effectivity is that the thickness should be about ¼ wave length. Reflectivity is describable as a curve and is given a value in effectivity in terms of wave lengths by selecting a value on the curve whereby a thickness selected for 2000 mc also has some effectivity for lower values. Any selection is in the nature of a compromise. If the selected thickness exceeds ¼ wave length, the increase in absorption for increased foam thickness is small.

As before stated, the composite structure or blanket 30 preferably has a dielectric constant of 2 to 10. The value of the dielectric constant in the present specific example of a blanket 30 having a thickness of one inch, may be taken as 6 to 8. The loss tangent preferably should be between 0.05 and 1.0 and may be taken as about 0.10 in this specific structure. Generally, the loss tangent should be as high as possible and the dielectric constant should be as low as possible. Permeativity is a more basic term but it is convenient to speak of a dielectric constant. The dielectric constant is dependent on the amount and type of filler. The dielectric constant is preferably as low as possible so that microwave energy can enter the structure with the least amount of discontinuity. However, the value of the desired dielectric constant is compromised to a higher value to maximize energy absorption. As more fully described hereinbelow, the structure of the corner 18 is graded in dielectric constant throughout a number of layers. If weight were not a consideration, the side walls would also have layers of foam graded as to dielectric constants. The side wall 12 is disposed at an angle greater than ninety degrees to a line 20 from the radar source and this facilitates entry of microwave energy into the wall, as the effect which might be called a "wedge effect" is to minimize discontinuity.

A particular problem exists at the lower corner 18 because, to a degree, the structure tends to reflect microwave energy back to its radar transmitter from a tangent on the radiused surface normal to the line 20 directly. The line or point of tangency changes as the aircraft banks. The solution used here is to maximize absorption of microwave energy at the corner 18. One factor interfering with energy absorption is the discontinuity between the dielectric constant of the air and of the structure. As described below, this discontinuity is minimized by using a graded structure. Another method of reducing the discontinuity of microwave energy absorption is by altering the wedge shape of the corner 18 in the manner shown. The corner 18 results in less discontinuity of microwave energy absorption than a surface normal to the line 20.

A built-up corner structure 34 is provided by bonding foam layers 40, 42, and 44 to the blanket 30. By way of example, the blanket 30 has a dielectric constant of 6 to 8. The layers 40, 42, 44 have dielectric constants of 3 to 4, 2 to 3, 1.5 to 2, respectively. This graded dielectric structure is quite effective in absorbing microwave energy. The amount of carbon needed to be absorbed to achieve these dielectric constants may readily be computed by those skilled in the art from standard publications in the field of antennas.

Whereas the corner 18 is left bare of a filter coating 48 for the action of absorbing energy described hereinabove, the areas of blanket 30 back from the corner 18 are provided with the filter coating 48 externally of a skin 50, that may be said to form the electrical shape of the fuselage for frequencies above 2,000 mc. The filter coating 48 is conveniently applied as a paint with a pigment concentration of aluminum of approximately 18 ounces per gallon where the coating has a thickness of 0.006 inch. The coating 48 acts as a filter in the sense that it reflects a low percentage of microwave energy of frequencies below 2,000 mc and a higher percentage of energy of frequencies above 2,000 mc. In some installations, considerations may dictate integrating the filter with the skin 50 or placing the filter coating 48 inside the skin 50.

The aluminum particles in the paint pigment of the coating 48 can have normal aluminum paint grind. This filter of aluminum would act like a sheet of metal if the particles did not tend to become electrically isolated. Such isolation results from oxidation of the aluminum as well as from some separation by the paint vehicle. Aluminum is the preferred pigment for the filter coating 48, partly because of the self-oxidizing properties. Other fillers such as silver, and graphite would need to have an insulator coating separating each particle to achieve the same isolation as ocurs from the oxidation of the aluminum.

An increased concentration of pigment in the paint, an increase coating thickness, and/or multiple coatings lower the frequency at which the filter 48 reflects. The filter 48 is preferably designed to reflect about 85 percent of the microwave energy at about 3,000 mc. In use of the filter 48, frequencies much below 2,000 mc are to be transmitted and/or absorbed. For example, if frequencies below 2,000 mc were not of concern, flat metal sheets could be used in the side wall 12 as far as values of reflection alone are concerned. At microwave frequencies below about 2,000 mc, for example at 500 mc, the angular disposition of the side wall 12 is ineffective to reflect microwaves upwardly. Accordingly, this lower range of microwave frequencies are best transmitted or absorbed.

The skin 50 of all fuselage areas is preferably formed of a typical aircraft fiberglas, plastic-impregnated sheet. The sheet is about 0.03 inch in thickness at the corner 18 and is increased to 0.06 inch thickness on other areas of the side walls 12 and the bottom wall 14. It should be noted that within the fuselage, as well as in other areas of the aircraft, metallic structures are avoided whenever possible. The bottom wall 14 is built up of or is a continuation of the same materials as the side walls 12. The bottom wall 14 is comprised of the shell 22, the filled blanket 30, the filter coating 48 and the skin 50.

Figure 4:
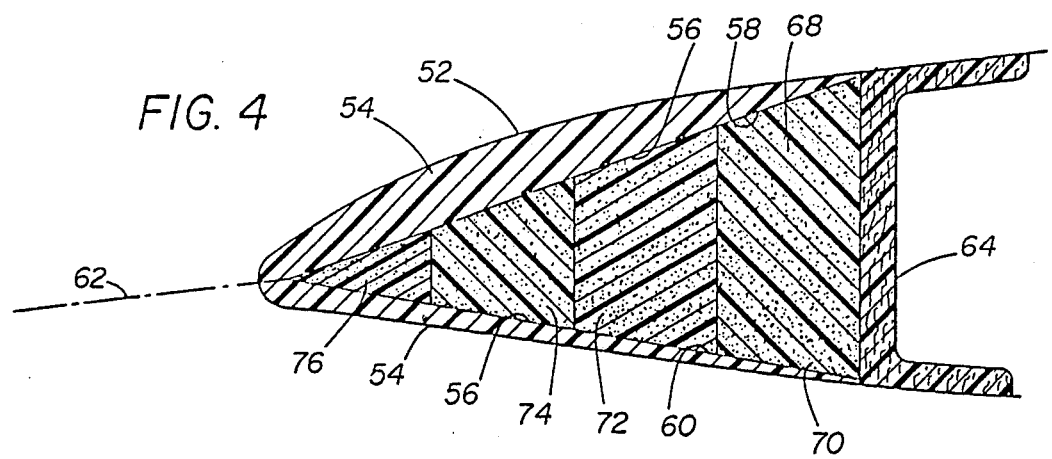
FIG. 4 is a partial cross sectional view of a port wing leading edge taken along line 4—4 of FIG. 1.

FIG. 4 shows a typical wing leading edge cross section. A skin 52 is formed of the same type of fiberglas reinforced plastic sheet as is used to form the skin 50 on the fuselage. The skin 52, in its preferred form, is 0.03 inch in thickness. The skin is structurally supported and its aerodynamic shape is defined by a rigid structural foam 54. The foam 54 may be the same type of material as the foam blanket 30 in the fuselage, but the foam 54 is preferably unfilled.

The inner surfaces of the foam body 54 are coated with a pigmented filter 56 of the same type, thickness, and concentration as the filter 48 of the fuselage. The filter 56 is interiorly applied to an upper surface 58 and a lower surface 60 on the inside of the foam body 54. The upper surface 58 tends to direct microwave reflection upward and the lower surface 60 tends to direct microwave reflection downward relative to a line 62 from a microwave energy source forward of the aircraft. An electrical corner is inside of the foam body 54, and is made sharp so that the type of problem discussed above with the radiused corner 18 of the fuselage is avoided.

A main forward load carrying member of the wing leading edge is a laterally extending spar 64, which is built up from resin impregnated fiberglas. The foam body 54 is bonded to and supported by the spar 64. A cavity 68 between the foam body 54 and spar 64 is filled with a plurality of filled foam layers 70, 72, 74, and 76. These layers have the same composition and have the same dielectric constants as the graded dielectric foams 30, 40, 42 and 44 in the fuselage lower corner 18.

The principles embodied in the foregoing fuselage and leading wing structures, for minimizing microwave energy reflection from a transmitter, may be variously applied to the other structures and/or empennage of the aircraft 10, or to other aircraft.

Figure 5:
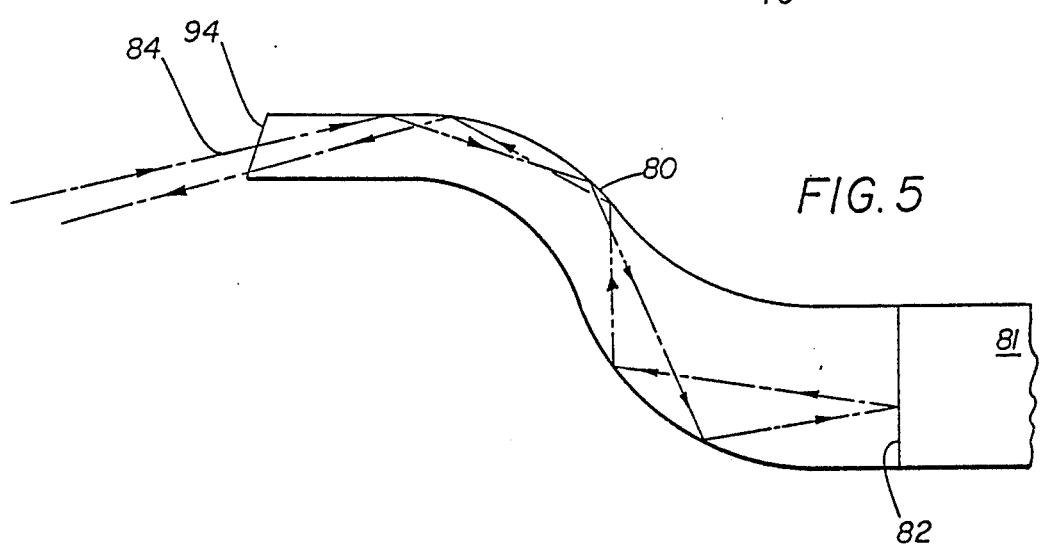
FIG. 5 is a diagrammatic fragmentary cross sectional view of an atmospheric air inlet duct leading to an air-breathing engine.

FIG. 5 shows the relationship of an air inlet duct 80 to an airbreathing aircraft engine 81. The functional purpose of inlet duct 80 is to duct atmospheric air to the engine 81. The improvement herein comprises the minimization of the reflection of microwave energy from a forward end or face 82 of the engine 81 back to the microwave energy source. It will be understood that a conventional straight, substantially horizontal air inlet duct would result in little if any interference with microwave reflection from the engine face 82. The inlet duct 80 shown in FIG. 5 has an ogee curved center line. Accordingly, when the inlet duct 80 is viewed from a forward hemisphere, the engine face 82 is entirely or almost entirely shielded. It may not be possible in some inlet duct situations to provide more than a slight bend therein but this important engine face shielding function of the duct 80 should be applied to the extent feasible. Accordingly, when the inlet duct 80 is viewed from directly forward of the aircraft, a minimum of the engine face 82 should be allowed to be exposed. Ten percent of the engine face area is an acceptable minimum.

The plane defined by the ogee curved center line is preferably vertical whereby the forward end thereof is above the rear end, as shown in FIG. 5. In other aircraft the vertical component of the ogee bend may have to be reduced towards a zero vertical component if the air inlet duct is disposed laterally of the aircraft fuselage, depending on the need in the aircraft to have an air inlet duct that is not top mounted. The function of the vertical component of the curved duct 80 is to direct microwave reflection to one or more of the duct walls upon entering the duct opening.

The line 84 denotes a beam of microwave energy from a radar transmitter and shows the same striking the interior wall of the air inlet duct 80 a number of times before reaching the engine face 82 and reflecting therefrom. This deflecting and reflecting phenomena tends to attenuate, absorb, or dissipate the energy and direct it on a line other than back to the transmitter. The phenomena of microwave absorption is facilitated by the materials of construction of the air inlet duct 80.

Figure 9:
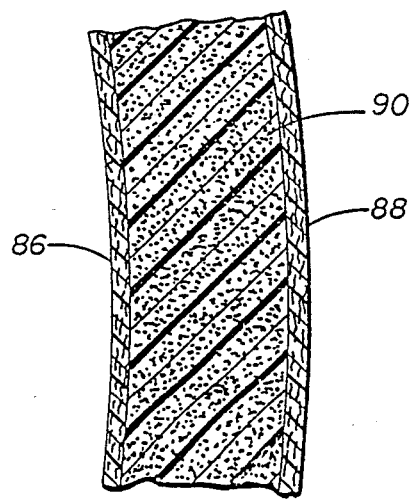
FIG. 9 is a view of a typical cross section of a wall of the engine air inlet duct.

The cross sectional details of the air inlet duct 80 are shown in FIG. 9 in which the inner and outer faces 86, 88 are formed of fiberglas reinforced plastic of the same type as the skins 50, 52 on fuselage and wing. These skins are 0.03 to 0.06 inch thick. The fiberglas sheets are applied to a structural foam 90 one-half or more inches in thickness filled with carbon as a microwave energy absorber. The foam 90 is of the same material as the foam blanket 30. The foam 90 has a dielectric constant of 4 to 8. The walls of the air inlet duct 80 are supported by other structure, preferably nonmetallic, not illustrated. It will be understood that microwave energy is absorbed as it impinges on the foam walls of the air inlet duct 80.

The exposed upright edge or lip 94 of inlet duct 80 is tipped back from the vertical, FIG. 5, to direct reflection of microwave energy upwardly. The requirements of aerodynamics, engine efficiency, and so forth, will determine the extent this lip 94 is inclined or tilted from the vertical, but the greater the better from the consideration of reflection. It usually will be possible to effect a compromise in which the lip 94 is tilted at least ten degrees to the vertical. The drawing illustrates an angle of twenty degrees from the vertical.

Figure 6:
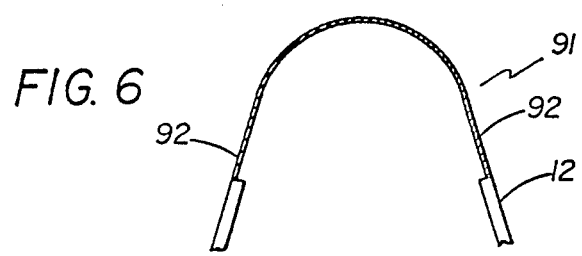
FIGS. 6 and 7 are respectively front and side views of a cockpit canopy of the vehicle, showing only the outlines thereof.
Figure 7:
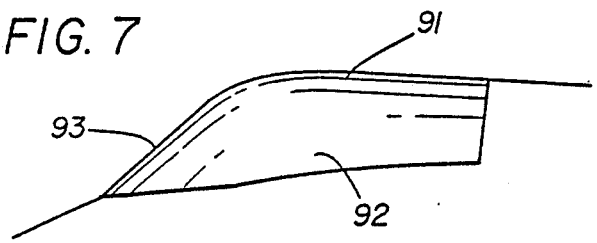
Figure 8:
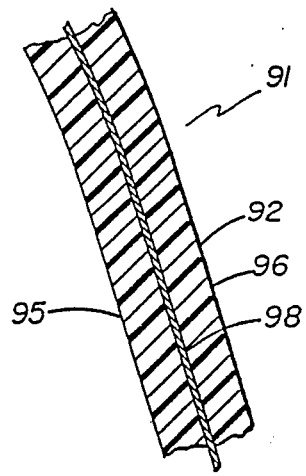
FIG. 8 is an enlarged partial sectional view of a canopy construction.

FIGS. 6, 7, and 8 show the means employed to avoid reflection of microwave energy from areas within a cockpit canopy 91 back toward a microwave energy source. The canopy 91 has side walls 92 and front walls 93, which are inclined at angles to the vertical whereby reflection therefrom will be in an upward direction in normal horizontal flight disposition of the aircraft 10.

The walls 92, 93 of the canopy 91 are made reflective by a laminated structure in which inner and outer acrylic laminates 95, 96 have a common interlaminar area therebetween occupied by a thin layer of metal 98. The metal 98 is thin enough to be optically transparent and thick enough to be electrically effective. This is achieved by a metal coating having a monomolecular thickness. The metal coating may be vapor deposited. Gold is a suitable metal for serving as an electrical filter. This filter is particularly effective on microwave energy above about 2,000 mc.

There may be instances where not all of the foregoing teachings need be used, but for the accomplishment of the purposes of the reconnaissance and surveillance vehicle 10, all of the teachings are desired to reduce to an acceptable level radar reflection back to its source. A desideratum is to have no microwave reflection back to its source, but where this is not possible it is better to have only intermittent microwave reflection or low grade microwave reflection than to have a more readily detectable microwave reflection.

In summary, the foregoing teachings include the use of pigmented filters for electrical shaping, the use of filled foam for energy absorption, and the design of angular relationships relative to a line from a microwave transmitter to avoid return of signals thereto. The total may be said to be more than the sum of the parts in that the structure herein disclosed is the result of compromises among a number of desirable expedients that are at times inconsistent. The resulting structure provides sufficient minimization of reflection to a radar source to be acceptable, and the best configuration known in the art for a reconnaissance and surveillance vehicle.

It will be understood that this invention can be modified to adapt it to various circumstances and conditions, and it is accordingly desired to comprehend within the purview of this invention such modifications as may be considered to fall within the scope of the appended claims.

We claim:

1. An aircraft fuselage structure having a central vertical plane comprising in transverse cross-section, curved top wall means, curved bottom wall means, and two substantially flat side wall means inclined inwardly and away from said bottom wall means toward each other, said side wall means having lower edges thereof respectively connected to opposite edges of said curved bottom wall means and having upper edge portions connected to opposite portions of said curved top wall means, and said side wall means extending away from said bottom wall means at an angle of at least ten degrees to the central vertical plane in such a manner that electromagnetic reflection of microwaves from a source located laterally of and below the aircraft fuselage structure are directed at an angle upwardly from the horizontal when the aircraft fuselage is in a substantially normal horizontal flight mode.

2. An aircraft fuselage structure as set forth in claim 1, wherein the angle of said wall means to the a plane parallel to the central vertical plane is between ten and twenty degrees.

3. An aircraft fuselage structure having a central vertical plane comprising in transverse cross-section, convexly curved top wall means, convexly curved bottom wall means, and two substantially flat side wall means inclined inwardly and away from said bottom wall means and toward each other, said side wall means extending away from said bottom wall means at an angle of at least ten degrees to the central vertical plane in such a manner that electromagnetic reflection of microwaves from a source located laterally of and below the aircraft fuselage structure are directed at an angle upwardly from the horizontal when the aircraft is in a substantially horizontal flight mode, said bottom wall means are joined to said side wall means at opposite edges of said side wall means to form corners, each of said corners being formed with an external radius of a maximum dimension of one inch, and said upright side wall means each defining with said bottom wall means at a tangent thereto adjacent said radius an angle measuring between seventy-five and one hundred degrees.

4. An aircraft fuselage structure as set forth in claim 3, wherein said angle between each of said side wall means and the tangent of said bottom wall means is approximately ninety degrees.

5. In an aircraft fuselage,
side wall means,
bottom wall means,
means forming a corner connecting said side wall means to said bottom wall means,
shell means including plastic honeycomb means and plastic rib means and plastic longeron means forming the principal structural frame of said fuselage side wall means and said bottom wall means and said corner means, said shell means comprising plastic reinforced with non-metallic fibers,
structural foam plastic means of between one-half and two inches in thickness covering at least a part of said shell means of said side wall means and said bottom wall means, said structural foam plastic means being filled with microwave absorbing material and having a dielectric constant of between two and ten,
laminated structural foam plastic means filled with microwave absorbing material covering at least a part of said shell means of said corner means and having from inside to outside laminates of increasingly higher dielectric constants, thin plastic skin means having non-metallic fiber reinforcement covering said structural foam plastic means, and microwave filter means in the form of a paint covering said thin plastic skin means of said side wall means and said bottom wall means, and said paint having a pigment including at least one of the materials selected from a group consisting of aluminum and silver and graphite.

6. In an aircraft fuselage as set forth in claim 5, wherein said structural foam plastic means of said side wall means and said bottom wall means have a thickness of approximately one inch and a dielectric constant of between six and eight and a loss tangent of between 0.05 and unity, said microwave absorbing material is carbon, and said pigment is oxidized aluminum.

7. In an aircraft fuselage as set forth in claim 5, wherein said laminated structural foam plastic means of said corner means has four laminates having from inside to outside dielectric constants of six to eight, three to four, two to three, and one and one-half to two.

8. In an aircraft, structural means for minimizing reflection of microwave energy back to its source comprising, plastic shell means including plastic honeycomb means forming a structural frame, said plastic shell means being reinforced with non-metallic fibers, structural foam plastic means covering said plastic shell means, said structural foam plastic means being filled with carbon microwave absorbing material and having a dielectric constant of between two and ten and a loss tangent of between 0.05 and unity, and thin plastic skin means having non-metallic fiber reinforcement means covering said structural foam plastic means.

9. In an aircraft as set forth in claim 8, microwave filter means covering said thin plastic skin means, said microwave filter means being in the form of a paint applied as a coating to said structural foam plastic means, and said paint having a pigment including oxidized aluminum substantially reflecting microwave energy above approximately two thousand megacycles.

10. In an aircraft fuselage, means for minimizing reflection of microwave energy back to its source and comprising, plastic supporting structure means reinforced with non-metallic fibers, laminated structural foam plastic means covering said plastic supporting structure means, said laminated structural foam plastic means being filled with microwave absorbing material, said laminated structural foam plastic means having an innermost layer with a dielectric constant of between two and ten and a loss tangent of between 0.05 and unity and each successive outer laminate having a lower dielectric constant than a preceding laminate, and thin plastic skin means having non-metallic fiber reinforcement covering said laminated structural foam plastic means.

11. In an aircraft fuselage as set forth in claim 10, wherein said microwave absorbing material is carbon, and said laminated structural foam plastic means has four laminates respectively having from inside to outside dielectric constants of six to eight, three to four, two to three, and one and one-half to two.

* * * * *